United States Patent
Owens et al.

(10) Patent No.: US 11,723,488 B2
(45) Date of Patent: Aug. 15, 2023

(54) SUGAR CONE TOASTING ASSEMBLY

(71) Applicants: Robert Owens, Rock Island, IL (US); Trish Owens, Rock Island, IL (US)

(72) Inventors: Robert Owens, Rock Island, IL (US); Trish Owens, Rock Island, IL (US)

( * ) Notice: Subject to any disclaimer, the term of this patent is extended or adjusted under 35 U.S.C. 154(b) by 315 days.

(21) Appl. No.: 17/203,167

(22) Filed: Mar. 16, 2021

(65) Prior Publication Data
US 2022/0296035 A1  Sep. 22, 2022

(51) Int. Cl.
*A47J 33/00* (2006.01)
*A21D 13/33* (2017.01)
*A47G 23/06* (2006.01)

(52) U.S. Cl.
CPC .......... *A47J 33/00* (2013.01); *A21D 13/33* (2017.01); *A47G 23/065* (2013.01)

(58) Field of Classification Search
CPC ........ A47J 33/00; A21D 13/33; A47G 23/065
See application file for complete search history.

(56) References Cited

U.S. PATENT DOCUMENTS

| | | | |
|---|---|---|---|
| 1,615,209 A | 1/1927 | Asselin | |
| 1,778,425 A * | 10/1930 | Maddocks | A47G 23/065 294/159 |
| 1,884,970 A * | 10/1932 | Davis | A47G 23/065 D7/706 |
| 4,065,085 A * | 12/1977 | Gellatly | A47J 33/00 126/30 |
| 4,896,651 A * | 1/1990 | Kott, Jr. | F24B 1/205 126/30 |
| 4,979,490 A | 12/1990 | Nudo | |
| 5,450,785 A | 9/1995 | Westbrooks | |
| 5,666,940 A * | 9/1997 | Kreiter | F24B 1/205 126/30 |
| 5,899,353 A | 5/1999 | Sabin | |
| 6,006,740 A * | 12/1999 | Ulrickson | F24B 1/205 126/29 |
| 6,827,077 B1 | 12/2004 | Haas | |
| 7,007,687 B2 | 3/2006 | Lewis | |
| D592,443 S | 5/2009 | Fraser | |
| 2015/0245631 A1 | 9/2015 | Ragain | |
| 2016/0045065 A1* | 2/2016 | Pribyl | A47J 37/043 426/523 |
| 2016/0081514 A1* | 3/2016 | Cauble | A47J 33/00 99/421 A |
| 2020/0037817 A1* | 2/2020 | Rynearson | A47J 37/0768 |

* cited by examiner

Primary Examiner — Alfred Basichas

(57) ABSTRACT

A sugar cone toasting assembly includes a spike that has a pointed end to penetrate ground near an open flame. A rod is removably attachable to the spike and a barrier is removably attachable to the rod. In this way the barrier can be elevated above the ground when the rod is attached to the spike and the spike is inserted into the ground. A plurality of holders is each disposed on the barrier and each of the holders extends over the open flame when the spike is inserted into the ground. Each of the holders has a curved portion forming a circle to receive a pointed end of a sugar cone thereby facilitating the sugar cone to be toasted by the open flame.

8 Claims, 6 Drawing Sheets

SUGAR CONE TOASTING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to toasting device and more particularly pertains to a new toasting device for toasting sugar cones over an open flame. The device includes a spike that is insertable into the ground next to an open flame. A plurality of holders, each with a rounded portion, is disposed on the spike and the rounded portion of each of the holders insertably receives a pointed end of a sugar cone. In this way the sugar cones can be supported over the open flame for toasting the sugar cones.

(2) Description of Related Art Including Information Disclosed Under 37 CFR 1.97 and 1.98

The prior art relates to toasting devices including an ice cream cone holder that includes a plurality of rings integrated into cage for holding ice cream cones. The prior art discloses a plurality of toasting devices that includes a cooking grate that is supported over an open flame with a rod that is inserted into the ground next to the open flame. The prior art discloses a variety of ice cream cone holders that have circular openings in a panel for holding ice cream cones.

BRIEF SUMMARY OF THE INVENTION

An embodiment of the disclosure meets the needs presented above by generally comprising a spike that has a pointed end to penetrate ground near an open flame. A rod is removably attachable to the spike and a barrier is removably attachable to the rod. In this way the barrier can be elevated above the ground when the rod is attached to the spike and the spike is inserted into the ground. A plurality of holders is each disposed on the barrier and each of the holders extends over the open flame when the spike is inserted into the ground. Each of the holders has a curved portion forming a circle to receive a pointed end of a sugar cone thereby facilitating the sugar cone to be toasted by the open flame.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
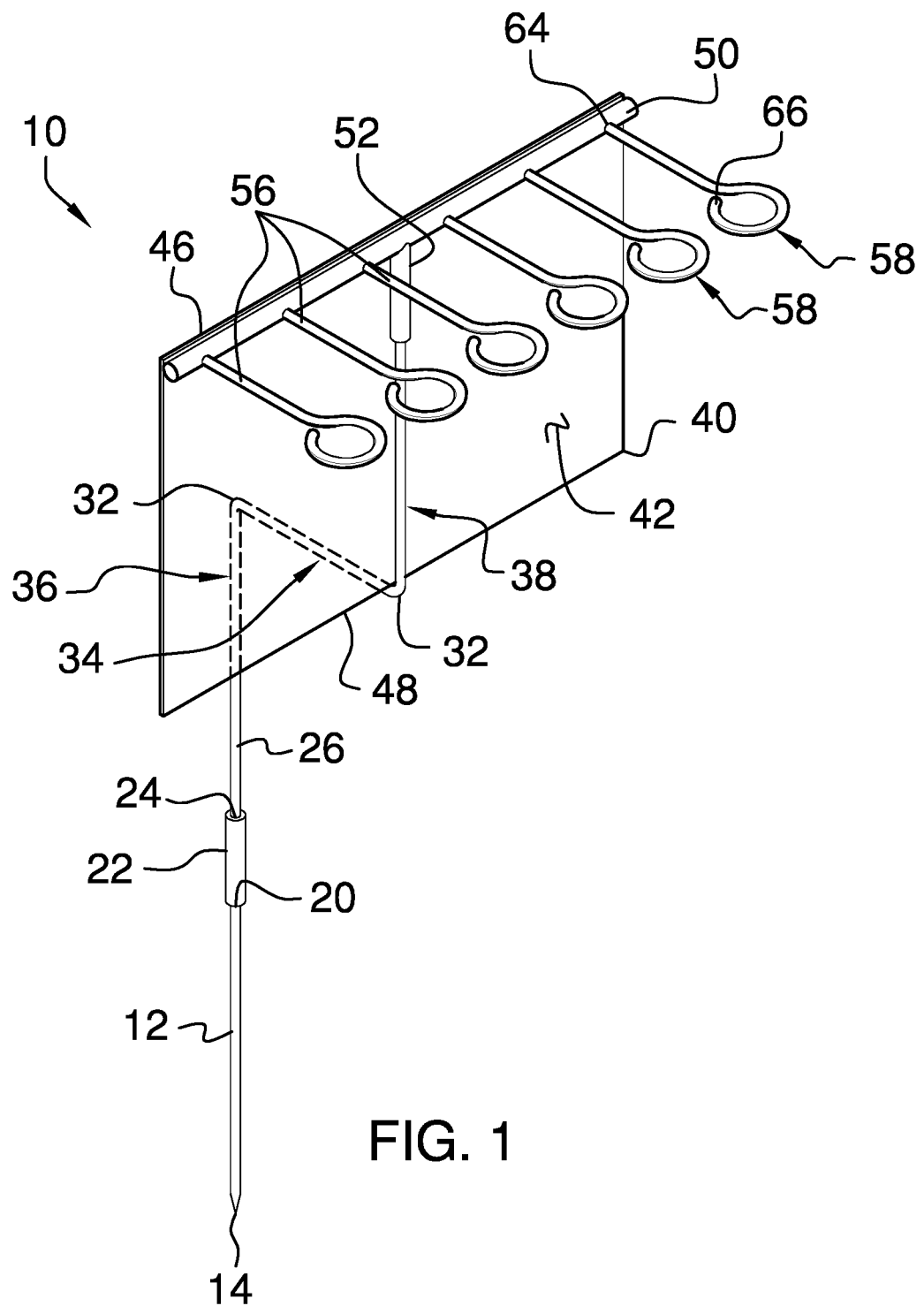
FIG. 1 is a front perspective view of a sugar cone toasting assembly according to an embodiment of the disclosure.
Figure 2:
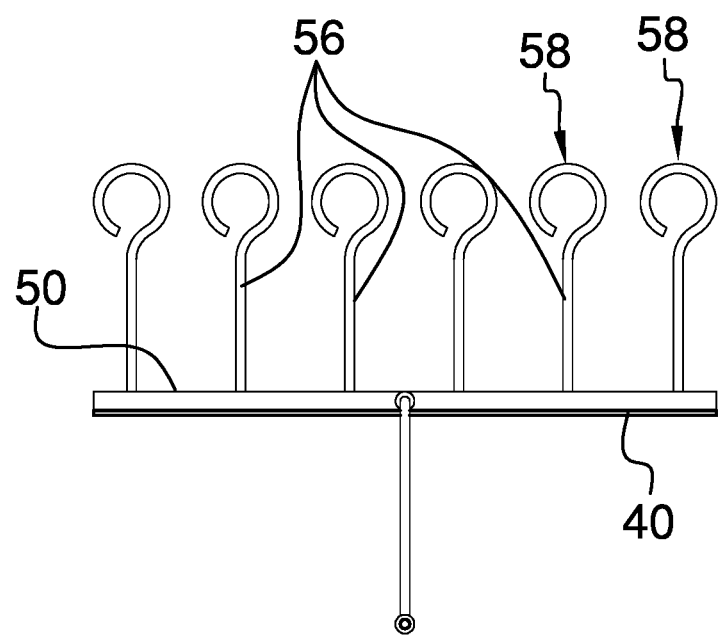
FIG. 2 is a bottom view of an embodiment of the disclosure.
Figure 3:
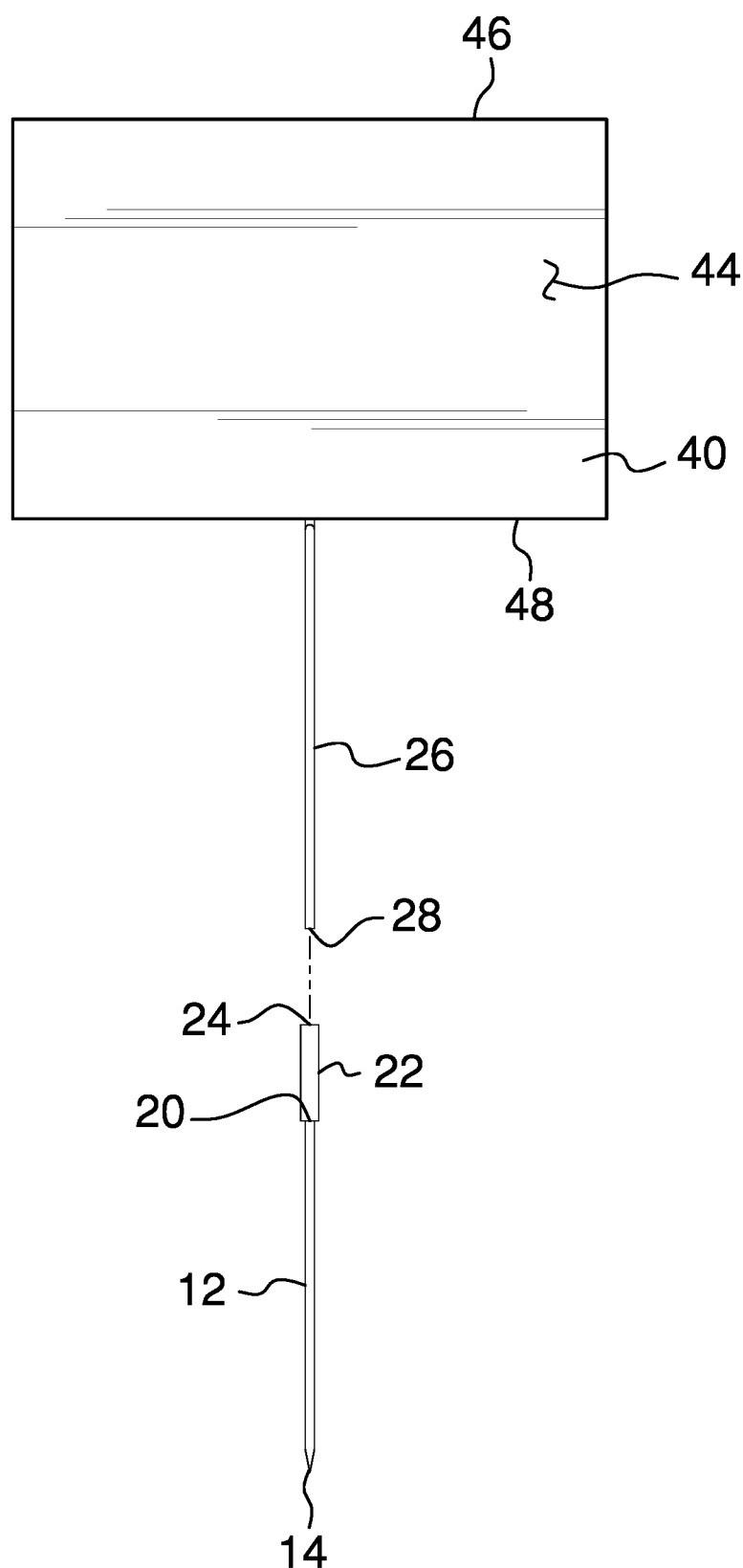
FIG. 3 is a back view of an embodiment of the disclosure.
Figure 4:
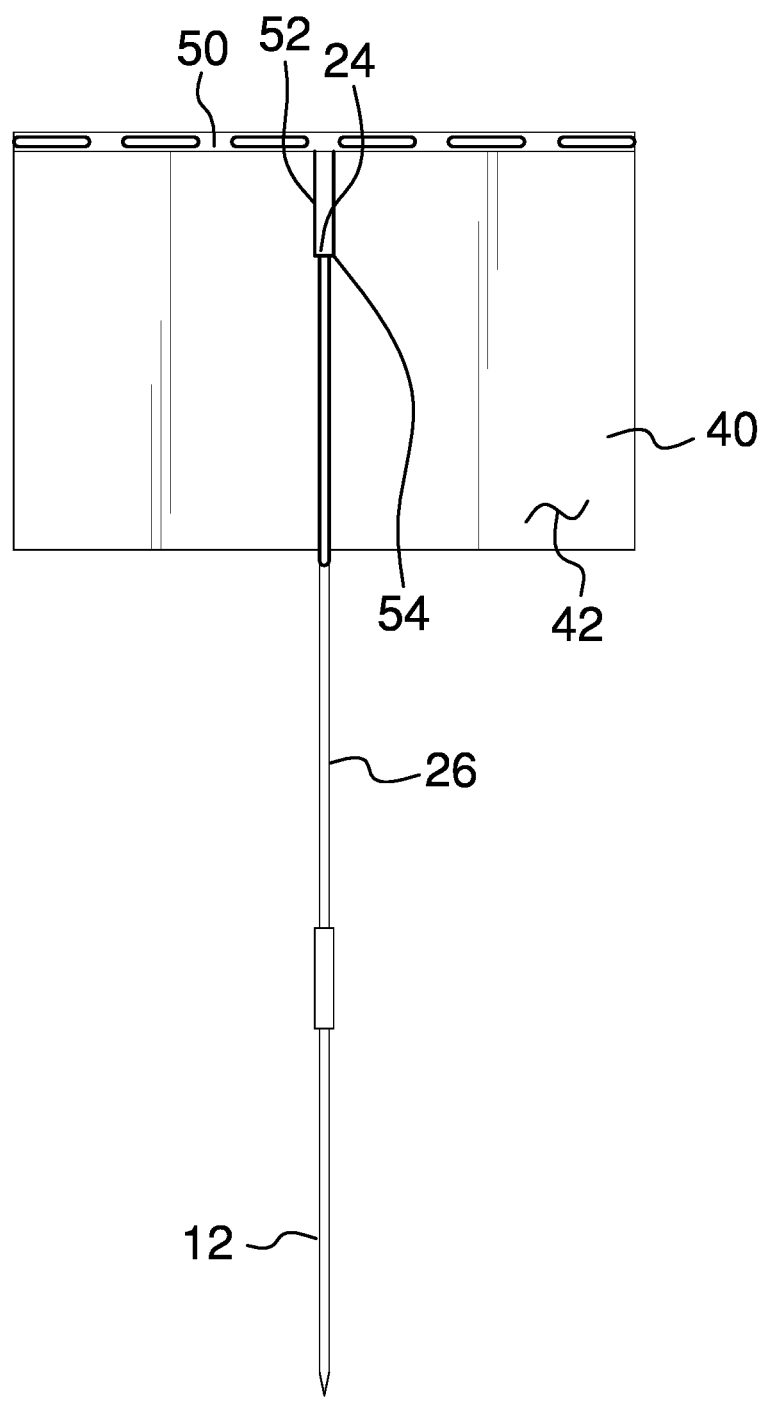
FIG. 4 is a front view of an embodiment of the disclosure.
Figure 5:
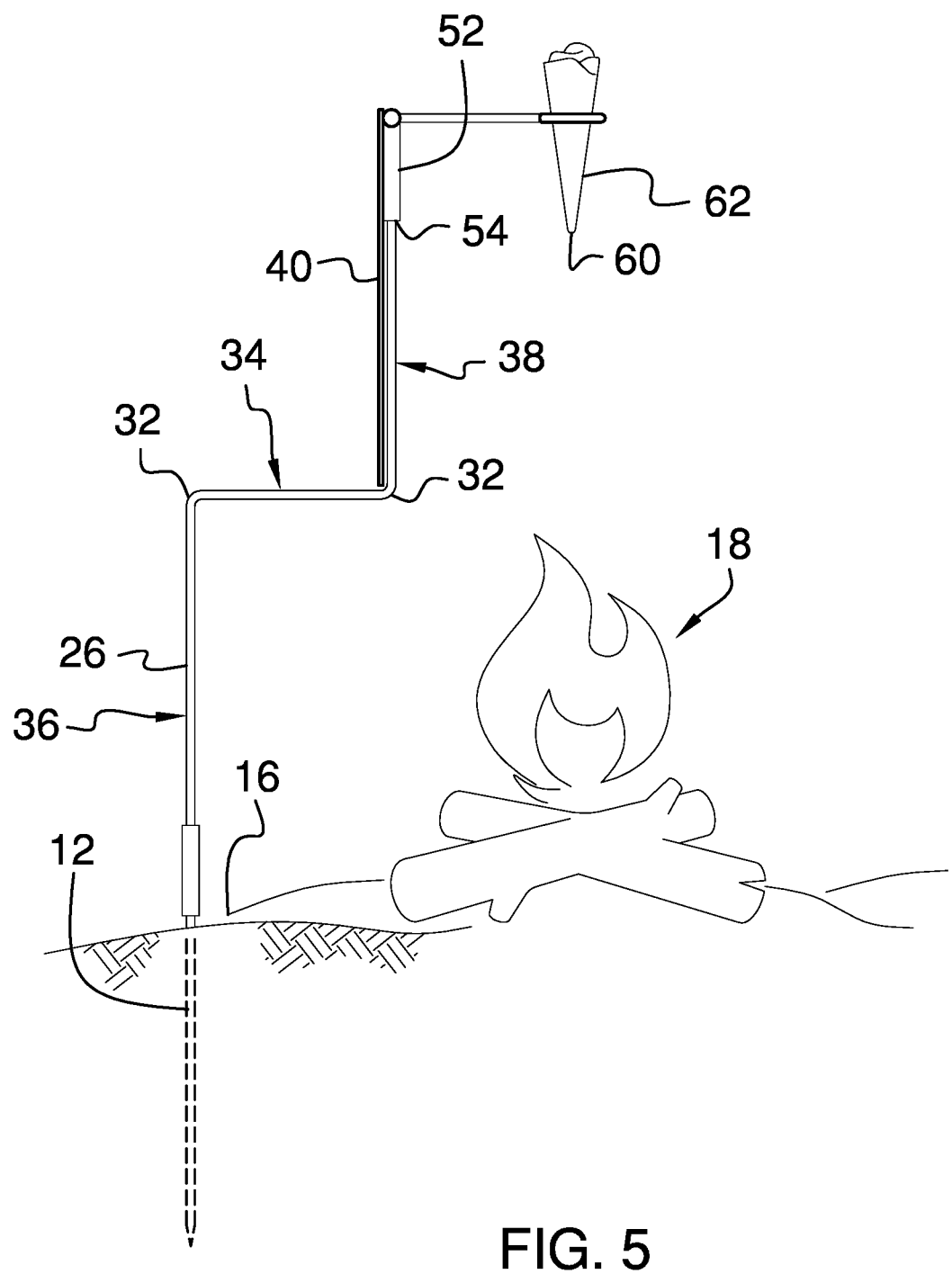
FIG. 5 is a perspective in-use view of an embodiment of the disclosure.
Figure 6:
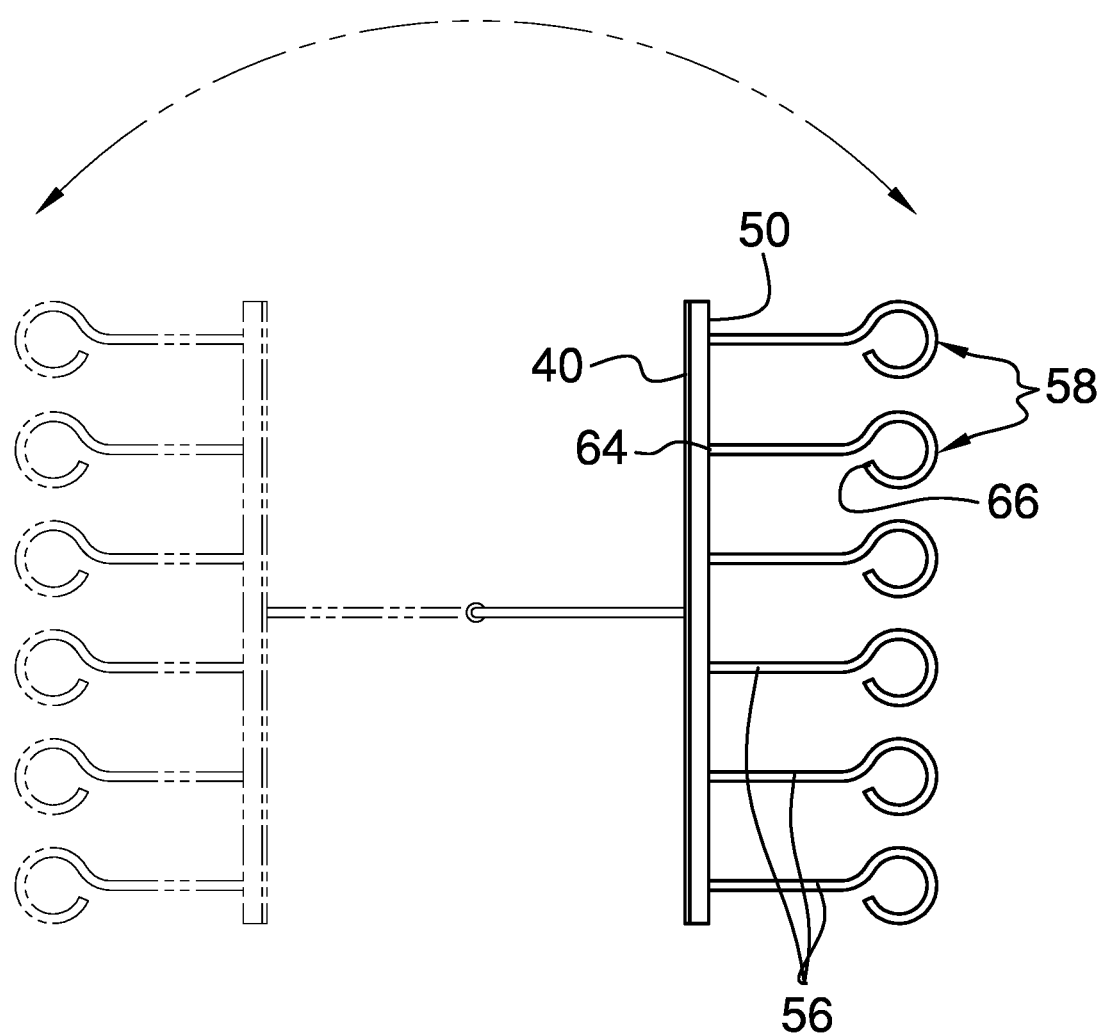
FIG. 6 is a top perspective view of an embodiment of the disclosure showing a rod being rotated in a sleeve.

With reference now to the drawings, and in particular to FIGS. 1 through 6 thereof, a new toasting device embodying the principles and concepts of an embodiment of the disclosure and generally designated by the reference numeral 10 will be described.

As best illustrated in FIGS. 1 through 6, the sugar cone toasting assembly 10 generally comprises a spike 12 that has a pointed end 14 to penetrate ground 16 near an open flame 18. The open flame 18 may be a campfire or other type of open flame that could be employed to toast marshmallows for smores or other type of sugary food. The spike 12 has a distal end 20 with respect to the pointed end 14 and the pointed end 14 tapers to a point. A sleeve 22 is coupled to and extends upwardly from the distal end 20 of the spike 12, and the sleeve 22 has an upper end 24.

A rod 26 is provided and the rod 26 is removably attachable to the spike 12 such that the rod 26 is vertically oriented with respect to the ground 16. The rod 26 has a lower end 28 and an upper end 30, and the rod 26 has a sequence of bends 32 distributed between the lower end 28 and the upper end 30 to define a central portion 34 that is oriented perpendicular to a lower portion 36 and an upper portion 38. The lower end 28 is associated with the lower portion 36, the upper end 30 of the rod 26 is associated with the upper portion 38 and the upper end 24 of the sleeve 22 insertably receives the lower end 28 of the rod 26.

A barrier 40 is removably attachable to the rod 26 such that the barrier 40 can be elevated above the ground 16 when the rod 26 is attached to the spike 12 and the spike 12 is inserted into the ground 16. The barrier 40 is comprised of a heat resistant material such that the barrier 40 resists being deformed by heat from the open flame 18. The heat resistant material may be steel or other similar material that can withstand temperatures produced by burning wood. The barrier 40 has a front surface 42, a back surface 44, an upper edge 46 and a lower edge 48. A member 50 is coupled to the front surface 42 of the barrier 40 and the member 50 is oriented to extend along the upper edge 46.

A tube 52 is coupled to and extends downwardly from the member 50. The tube 52 is positioned against the front surface 42 of the barrier 40 and the tube 52 has a distal end 54 with respect to the member 50. The distal end 54 of the tube 52 insertably receives the upper end 28 of the rod 26 having the lower edge 48 of the barrier 40 resting on the central portion 34 of the rod 26. Additionally, the front surface 42 of the barrier 40 rests against the upper portion 38 of the rod 26 when the upper end 28 of the rod 26 is inserted into the tube 52. The rod 26 is rotatable in the sleeve 22 such that the barrier 40 can be manipulated to orbit around the spike 12.

A plurality of holders 56 is provided and each of the holders 56 is disposed on the barrier 40. In this way each of the holders 56 can extend over the open flame 18 when the spike 12 is inserted into the ground 16 and the barrier 40 is attached to the rod 26. Each of the holders 56 has a curved portion 58 forming a circle such that the curved portion 58 of each of the holders 56 can receive a pointed end 60 of a sugar cone 62. Additionally, the holders 56 facilitate the sugar cones 62 to be vertically oriented over the open flame 18 thereby facilitating the sugar cone 62 in the curved portion 58 of each of the holders 56 to be toasted by the open flame 18. In this way the sugar cones 62 can be toasted without requiring the sugar cones 62 to be held by a user which could cause the user to be burned by the open flame 18.

Each of the holders 56 has a first end 64 and a second end 66, and the first end 64 of each of the holders 56 is coupled to the member 50. Moreover, each of the holders 56 extends along a line that is oriented perpendicular to the member 50 such that each of the holders 56 is directed away from the front surface 42 of the barrier 40. The curved portion 58 of each of the holders 56 is positioned adjacent to the second end 66 of the holders 56 such that the curved portion 58 of each of the holders 56 is distally positioned with respect to the front surface 42 of the barrier 40. The curved portion 58 of each of the holders 56 lies on a horizontal plane when the spike 12 is inserted into the ground 16 and the barrier 40 is attached to the rod 26.

In use, the spike 12 inserted into the ground 16 at a location that is adjacent to the open flame 18. The rod 26 is inserted into the sleeve 22 and the tube 52 is positioned onto the rod 26 such that the holders 56 extend above the open flame 18. Each of the sugar cones 62 is inserted into a respective one of the holders 56 such that the sugar cones 62 are supported over the open flame 18. In this way the sugar cones 62 can be toasted over the open flame 18 for making smores or other traditional campfire treats. The rod 26 is rotated in the sleeve 22 to spin the holders 56 away from the open flame 18 thereby facilitating the user to remove sugar cones 62 from holders 56 without being burned by the open flame 18.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A sugar cone toasting assembly for supporting sugar cones over an open flame to toast the sugar cones, said assembly comprising:
    a spike having a pointed end wherein said pointed end is configured to penetrate ground near an open flame;
    a rod being removably attachable to said spike wherein said rod is configured to be vertically oriented with respect to the ground;
    a barrier being removably attachable to said rod wherein said barrier is configured to be elevated above the ground when said rod is attached to said spike and said spike is inserted into the ground, said barrier being comprised of a heat resistant material wherein said barrier is configured to resist being deformed by heat from the open flame; and
    a plurality of holders, each of said holders being disposed on said barrier wherein each of said holders is configured to extend over the open flame when said spike is inserted into the ground and said barrier is attached to said rod, each of said holders having a curved portion forming a circle wherein said curved portion of each of said holders is configured to receive a pointed end of a sugar cone having the sugar cone being vertically oriented over the open flame thereby facilitate the sugar cone in said curved portion of each of said holders to be toasted by the open flame.

2. The assembly according to claim 1, wherein:
    said spike having a distal end with respect to said pointed end, said pointed end tapering to a point;
    said assembly includes a sleeve being coupled to and extending upwardly from said distal end of said spike, said sleeve having an upper end; and
    said rod has a lower end and an upper end, said upper end of said sleeve insertably receiving said lower end of said rod.

3. The assembly according to claim 2, wherein said rod has a sequence of bends being distributed between said lower end and said upper end to define a central portion being oriented perpendicular to a lower portion and an upper portion, said lower end being associated with said lower portion, said upper end being associated with said upper portion, said upper end of said sleeve insertably receiving said lower end of said rod.

4. The assembly according to claim 1, wherein:
said barrier has a front surface, a back surface, an upper edge and a lower edge;
said assembly includes a member being coupled to said front surface of said barrier, said member being oriented to extend along said upper edge; and
said assembly includes a tube being coupled to and extending downwardly from said member, said tube being positioned against said front surface of said barrier.

5. The assembly according to claim 4, wherein:
said rod has a lower end and an upper end, said upper end of said sleeve insertably receiving said lower end of said rod, said rod has a sequence of bends being distributed between said lower end and said upper end to define a central portion being oriented perpendicular to a lower portion and an upper portion, said lower end being associated with said lower portion, said upper end being associated with said upper portion; and
said tube has a distal end with respect to said member, said distal end of said tube insertably receiving said upper end of said rod having said lower edge of said barrier resting on said central portion of said rod and having said front surface of said barrier resting against said upper portion of said rod.

6. The assembly according to claim 4, wherein each of said holders has a first end and a second end, said first end of each of said holders being coupled to said member such that each of said holders extends along a line being oriented perpendicular to said member such that each of said holders is directed away from said front surface of said barrier.

7. The assembly according to claim 6, wherein said curved portion of each of said holders is positioned adjacent to said second end of said holders such that said curved portion of each of said holders is distally positioned with respect to said front surface of said barrier, said curved portion of each of said holders lying on a horizontal plane when said spike is inserted into the ground and said barrier is attached to said rod.

8. A sugar cone toasting assembly for supporting sugar cones over an open flame to toast the sugar cones, said assembly comprising:
a spike having a pointed end wherein said pointed end is configured to penetrate ground near an open flame, said spike having a distal end with respect to said pointed end, said pointed end tapering to a point;
a sleeve being coupled to and extending upwardly from said distal end of said spike, said sleeve having an upper end;
a rod being removably attachable to said spike wherein said rod is configured to be vertically oriented with respect to the ground, said rod having a lower end and an upper end, said rod having a sequence of bends being distributed between said lower end and said upper end to define a central portion being oriented perpendicular to a lower portion and an upper portion, said lower end being associated with said lower portion, said upper end being associated with said upper portion, said upper end of said sleeve insertably receiving said lower end of said rod;
a barrier being removably attachable to said rod wherein said barrier is configured to be elevated above the ground when said rod is attached to said spike and said spike is inserted into the ground, said barrier being comprised of a heat resistant material wherein said barrier is configured to resist being deformed by heat from the open flame, said barrier having a front surface, a back surface, an upper edge and a lower edge;
a member being coupled to said front surface of said barrier, said member being oriented to extend along said upper edge;
a tube being coupled to and extending downwardly from said member, said tube being positioned against said front surface of said barrier, said tube having a distal end with respect to said member, said distal end of said tube insertably receiving said upper end of said rod having said lower edge of said barrier resting on said central portion of said rod and having said front surface of said barrier resting against said upper portion of said rod; and
a plurality of holders, each of said holders being disposed on said barrier wherein each of said holders is configured to extend over the open flame when said spike is inserted into the ground and said barrier is attached to said rod, each of said holders having a curved portion forming a circle wherein said curved portion of each of said holders is configured to receive a pointed end of a sugar cone having the sugar cone being vertically oriented over the open flame thereby facilitate the sugar cone in said curved portion of each of said holders to be toasted by the open flame, each of said holders having a first end and a second end, said first end of each of said holders being coupled to said member such that each of said holders extends along a line being oriented perpendicular to said member such that each of said holders is directed away from said front surface of said barrier, said curved portion of each of said holders being positioned adjacent to said second end of said holders such that said curved portion of each of said holders is distally positioned with respect to said front surface of said barrier, said curved portion of each of said holders lying on a horizontal plane when said spike is inserted into the ground and said barrier is attached to said rod.

\* \* \* \* \*